(12) United States Patent
Tobinaga (10) Patent No.: US 12,065,325 B2
(45) Date of Patent: Aug. 20, 2024

(54) CONVEYANCE MECHANISM AND IMAGE FORMING APPARATUS

(71) Applicant: Hideki Tobinaga, Kanagawa (JP)

(72) Inventor: Hideki Tobinaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 18/060,264

(22) Filed: Nov. 30, 2022

(65) Prior Publication Data

US 2023/0202787 A1  Jun. 29, 2023

(30) Foreign Application Priority Data

Dec. 24, 2021 (JP) ................. 2021-210908

(51) Int. Cl.
*B65H 5/38* (2006.01)
*B65H 29/04* (2006.01)
(Continued)

(52) U.S. Cl.
CPC ............. *B65H 29/044* (2013.01); *F16F 1/44* (2013.01); *F16F 1/46* (2013.01); *B65H 2402/53* (2013.01);
(Continued)

(58) Field of Classification Search
CPC . B65H 5/36; B65H 5/38; B65H 5/062; B65H 29/125; B65H 29/52; B65H 29/044; B65H 2404/611; B65H 2404/441; B65H 2404/152; B65H 2404/15212; B65H 2404/1341; B65H 2601/11; B65H 2601/321; G03G 21/1638; G03G 2215/00544
See application file for complete search history.

(56) References Cited

U.S. PATENT DOCUMENTS 7,548,723 B2 * 6/2009 Kang ............... B65H 31/02
400/624
10,942,483 B2 * 3/2021 Watanabe ............ B65H 31/02
(Continued)

FOREIGN PATENT DOCUMENTS

JP         59214064 A  * 12/1984
JP         61-062991      3/1986
(Continued)

*Primary Examiner* — Luis A Gonzalez
(74) *Attorney, Agent, or Firm* — Harness, Dickey & Pierce, P.L.C.

(57) ABSTRACT

A conveyance mechanism includes a lower conveyance guide below an inclined conveyance path having upward or downward inclinations with which a sheet material is to be conveyed, that guides a lower surface of the sheet material; an upper conveyance guide above the inclined conveyance path, that guides an upper surface of the sheet-shaped material, the upper conveyance guide being openable and closable about a rotation shaft, which is on a side of the inclined conveyance path in a direction of a width of the inclined conveyance path to extend along the inclined conveyance path; and a first urging member to urge a portion of the upper conveyance guide away from the rotation shaft in the direction of the width of the inclined conveyance path toward the rotation shaft, the portion of the upper conveyance guide being at an upper end of the upper conveyance guide in an inclined direction.

10 Claims, 8 Drawing Sheets

(51) Int. Cl.
*B65H 29/12* (2006.01)
*F16F 1/44* (2006.01)
*F16F 1/46* (2006.01)

(52) U.S. Cl.
CPC .... *B65H 2402/54* (2013.01); *B65H 2404/154* (2013.01)

(56) References Cited

U.S. PATENT DOCUMENTS

| | | |
|---|---|---|
| 2007/0264063 A1 | 11/2007 | Sano et al. |
| 2010/0225045 A1 | 9/2010 | Kimura et al. |
| 2011/0304092 A1 | 12/2011 | Kambayashi et al. |
| 2012/0057212 A1 | 3/2012 | Tobinaga et al. |
| 2012/0119432 A1 | 5/2012 | Kambayashi et al. |
| 2012/0119436 A1 | 5/2012 | Morita et al. |
| 2014/0084531 A1 | 3/2014 | Fukumoto et al. |
| 2015/0132039 A1 | 5/2015 | Tobinaga et al. |
| 2015/0251864 A1 | 9/2015 | Aoyama et al. |
| 2017/0115618 A1 | 4/2017 | Tobinaga et al. |
| 2017/0227911 A1 | 8/2017 | Kuno et al. |
| 2018/0148286 A1* | 5/2018 | Hari .................. B65H 5/38 |
| 2019/0039842 A1 | 2/2019 | Aoyama et al. |
| 2019/0193968 A1 | 6/2019 | Toyooka et al. |
| 2021/0138807 A1* | 5/2021 | Shimojima .......... B65H 29/125 |
| 2021/0179373 A1 | 6/2021 | Aoyama et al. |
| 2021/0373476 A1 | 12/2021 | Tobinaga |

FOREIGN PATENT DOCUMENTS

| | | | |
|---|---|---|---|
| JP | 10077137 A | * | 3/1998 |
| JP | 2006-044820 | | 2/2006 |
| JP | 2010-195551 | | 9/2010 |

* cited by examiner

CONVEYANCE MECHANISM AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2021-210908, filed on Dec. 24, 2021, in the Japan Patent Office, the entire disclosure of which is hereby incorporated by reference herein.

BACKGROUND

Technical Field

The present disclosure relates to a conveyance mechanism for conveying a sheet-shaped material, and an image forming apparatus including the conveyance mechanism.

Related Art

An image forming apparatus includes any one of a copying machine, a facsimile machine, a printer, and an inkjet recording apparatus, or a multifunction peripheral equipped with a combination of at least two of a copying machine, a facsimile machine, a printer, and an inkjet recording apparatus. Such an image forming apparatus is provided with conveyance mechanisms at a plurality of positions in the main body thereof to convey a sheet material, such as a recording medium, in a horizontal direction, a vertical direction, and an upward or downward inclined direction. Of the conveyance mechanisms, a conveyance mechanism in a location where a sheet material is likely to be jammed is configured to be openable and closable to facilitate jam clearing.

SUMMARY

Embodiments of the present disclosure provide an inclined conveyance mechanism including a lower conveyance guide and an upper conveyance guide. The lower conveyance guide is located below an inclined conveyance path having an upward inclination or a downward inclination with which a sheet material is to be conveyed. The lower conveyance guide guides a lower surface of the sheet-shaped material. The upper conveyance guide is located above the inclined conveyance path. The upper conveyance guide guides an upper surface of the sheet-shaped material. The upper conveyance guide is openable and closable about a rotation shaft. The rotation shaft is disposed on a side of the inclined conveyance path in a direction of a width of the inclined conveyance path so as to extend along the inclined conveyance path. The upper conveyance guide is configured such that a portion of the upper conveyance guide away from the rotation shaft in the direction of the width of the inclined conveyance path is urged toward the rotation shaft by a first urging member. The portion of the upper conveyance guide away from the rotation shaft is at an upper end of the upper conveyance guide in an inclined direction.

Other embodiments of the present disclosure provide an image forming apparatus including the inclined conveyance mechanism described above.

Other embodiments of the present disclosure provide a conveyance mechanism including a first-side conveyance guide and a second-side conveyance guide. The first-side conveyance guide is located on a first side of a conveyance path along which a sheet material is to be conveyed in a vertical direction. The first-side conveyance guide guides a first surface of the sheet-shaped material. The second-side conveyance guide is located on a second side of the conveyance path facing the first side. The second-side conveyance guide guides a second surface of the sheet material opposing the first surface. The first-side conveyance guide is openable and closable about a rotation shaft. The rotation shaft is disposed on a side of the conveyance path in a direction of a width of the conveyance path so as to extend along the conveyance path. The first-side conveyance guide is configured such that a portion of the first-side conveyance guide away from the rotation shaft in the direction of the width of the conveyance path is urged toward the rotation shaft by a first urging member. The portion of the first-side conveyance guide away from the rotation shaft is at an upper end of the first-side conveyance guide.

Other embodiments of the present disclosure provide an image forming apparatus including the conveyance mechanism described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In an image forming apparatus of the related art, in an example, a paper jam in a conveyance mechanism for conveying a sheet material in a vertical direction is cleared by opening an opening/closing door. In the example, a paper jam in a conveyance mechanism for conveying a sheet material in a horizontal direction or an inclined direction is cleared by opening an upper conveyance guide.

In the inclined conveyance mechanism for conveying a sheet material in the inclined direction, the upper conveyance guide is rotated upward about a rotation shaft disposed on one side of an inclined conveyance path to open the upper conveyance guide. Because the rotation shaft is inclined, gravity acting on the upper conveyance guide applies a force to deform a housing of the upper conveyance guide downward along the inclined conveyance path.

Such downward deformation does not occur if the housing of the upper conveyance guide has sufficient rigidity. As the rigidity of the housing increases, a mass of the housing increases, resulting in an increase in the gravity. In practice, the deformation of the housing of the upper conveyance guide is inevitable to varying degrees. Such deformation of the upper conveyance guide may cause inclination of the axis of a conveyance roller of the upper conveyance guide. As a result, a paper skew or jam may occur.

In the conveyance path for conveying a sheet material in the vertical direction, a paper skew or jam may also occur. Specifically, when a one-side conveyance guide for guiding one surface of a sheet material is opened in a horizontal direction in a way similar to that of the opening/closing door in the example described above, the one-side conveyance guide may be deformed by its own weight.

Accordingly, embodiments of the present disclosure provide a conveyance mechanism and an image forming apparatus that prevent deformation of a conveyance guide of the conveyance mechanism due to an opening or closing operation.

Inkjet Printer

Figure 1:
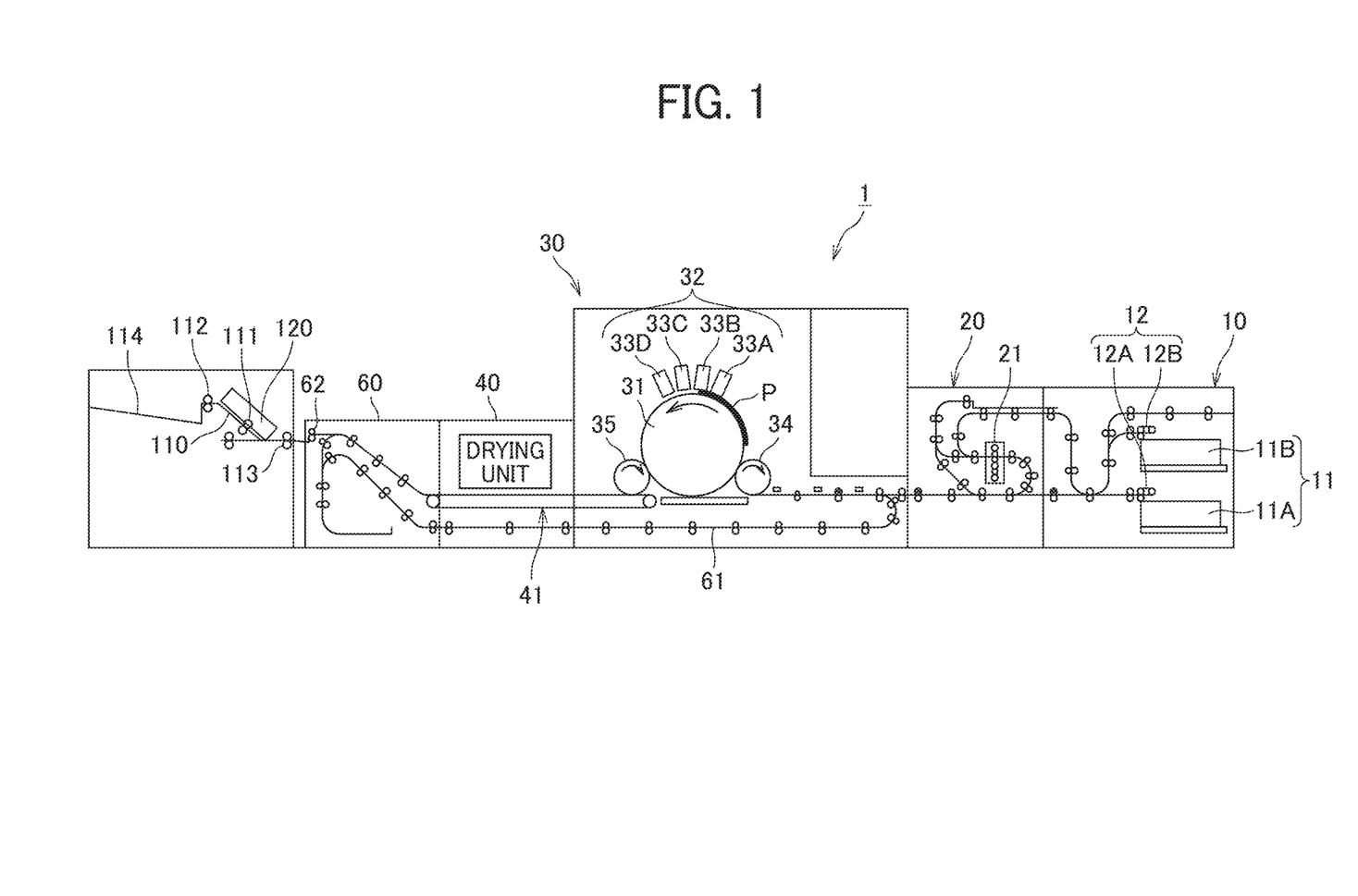
FIG. 1 is a schematic view of an image forming apparatus according to an embodiment of the present disclosure.

Hereinafter, an embodiment of the present disclosure will be described with reference to the drawings. FIG. 1 is a schematic view of an inkjet printer 1 serving as an image forming apparatus. The inkjet printer 1 is an example of line-head liquid discharging apparatus. The inkjet printer 1 includes a loading unit 10 for loading a sheet P to which liquid is to be applied, a pre-treatment unit 20, an image forming unit (image forming device) 30, a drying unit 40, a sheet reversing mechanism 60, and a discharge tray 114. The sheet P is a recording medium, as an example of a sheet material. The image forming unit 30 is illustrated in an enlarged form in FIG. 2. The sheet reversing mechanism 60 includes multiple conveyance rollers. An inclined conveyance mechanism according to this embodiment, which will be described below, is disposed between a last conveyance roller 62 among the multiple conveyance rollers of the sheet reversing mechanism 60 and the discharge tray 114.

In the inkjet printer 1, the pre-treatment unit 20 applies a pre-treatment liquid to the sheet P loaded (or supplied) from the loading unit 10, as appropriate. Then, the image forming unit 30 applies liquid to the sheet P and performs desired printing. Then, the drying unit 40 dries the liquid adhering to the sheet P. After that, the sheet P is discharged to an unloading unit.

The loading unit 10 includes a loading tray 11 for receiving a plurality of sheets P, and a feeding device 12 for separately feeding the sheets P one by one from the loading tray 11. The loading tray 11 includes a lower loading tray 11A and an upper loading tray 11B. The feeding device 12 includes feeding devices 12A and 12B. The sheet P fed from the loading unit 10 is supplied to the pre-treatment unit 20. The pre-treatment unit 20 includes an application unit 21. The application unit 21 is a treatment liquid applying unit for applying a treatment liquid to a printing surface of the sheet P. In an example, the treatment liquid has the operational effect of aggregating a coloring material of ink to prevent set-off.

Figure 2:
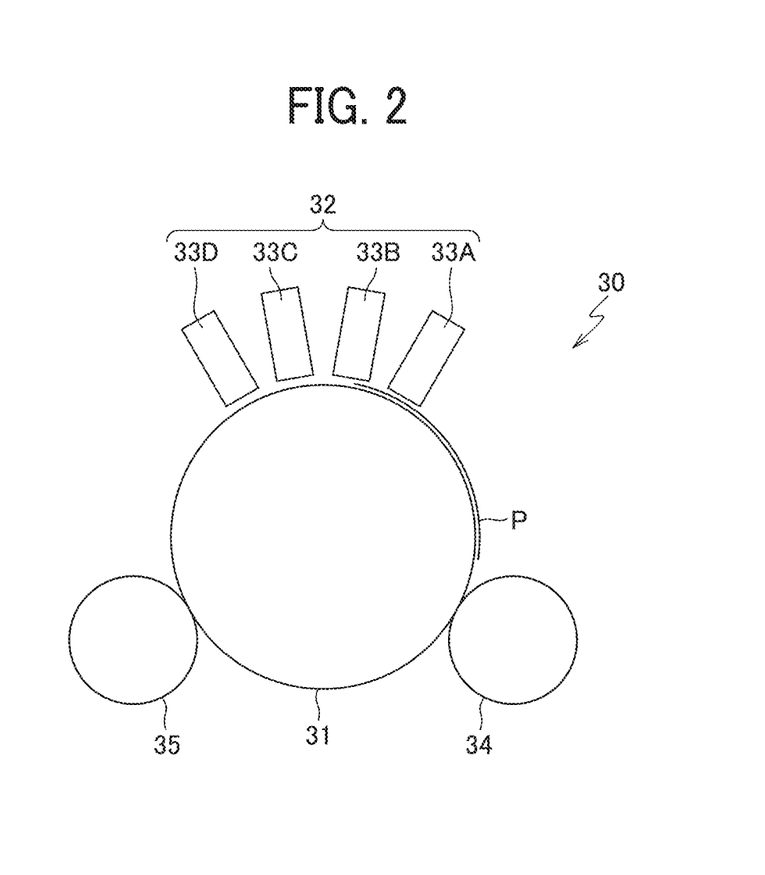
FIG. 2 is a schematic view of an image forming unit according to the embodiment of the present disclosure.

As illustrated in FIG. 2, the image forming unit 30 includes a conveyance drum 31 and a droplet discharger 32. The conveyance drum 31 is a supporting member (rotary body) that rotates while supporting the sheet P on a peripheral surface thereof. The droplet discharger 32 discharges liquid onto the sheet P supported on the conveyance drum 31. The image forming unit 30 further includes a transfer cylinder 34 and a delivery cylinder 35. The transfer cylinder 34 receives the sheet P delivered from the pre-treatment unit 20 and transfers the sheet P to the conveyance drum 31. The delivery cylinder 35 receives the sheet P conveyed by the conveyance drum 31 and delivers the sheet P to the drying unit 40.

The conveyance drum 31 and the transfer cylinder 34 are coupled to each other by gears, and the conveyance drum 31 and the delivery cylinder 35 are coupled to each other by gears. The conveyance drum 31, the transfer cylinder 34, and the delivery cylinder 35 are each provided with a gripper. The sheet P is conveyed between the transfer cylinder 34 and the conveyance drum 31 and between the conveyance drum 31 and the delivery cylinder 35 while being sequentially held by the respective grippers.

The transfer cylinder 34 includes a gripper (or sheet gripper) to grip a leading end of the sheet P conveyed from the pre-treatment unit 20 to the image forming unit 30. The sheet P, the leading end of which is gripped by the gripper, is conveyed as the transfer cylinder 34 rotates. The sheet P conveyed by the transfer cylinder 34 is delivered to the conveyance drum 31 at a position facing the conveyance drum 31.

The conveyance drum 31 includes a gripper (or sheet gripper) on a surface of the conveyance drum 31 to grip the leading end of the sheet P. The conveyance drum 31 has multiple suction holes dispersed on a surface of the conveyance drum 31. A suction unit generates suction airflows that are directed from desired suction holes among the multiple suction holes in the conveyance drum 31 toward the inside of the conveyance drum 31. The sheet gripper of the conveyance drum 31 grips the leading end of the sheet P forwarded from the transfer cylinder 34 to the conveyance drum 31. The sheet P is attracted to and supported on the conveyance drum 31 by the suction airflows generated by the suction unit. As the conveyance drum 31 rotates, the sheet P is conveyed.

The droplet discharger 32 includes four droplet discharge units 33 (33A to 33D) for discharging droplets. The droplet discharge units 33 (33A to 33D) are disposed radially at equal intervals and symmetrically in FIG. 1 along an upper portion of the outer periphery of the conveyance drum 31.

The droplet discharge units 33 are each a functional component having a nozzle from which liquid is to be discharged and ejected. The liquid to be discharged is not limited as long as the liquid has viscosity or surface tension enough to be discharged from a head of each of the droplet discharge units 33. In one example, preferably, the viscosity of the liquid is not greater than 30 mPa·s under ordinary temperature and ordinary pressure or by heating or cooling.

The droplet discharge unit 33A is configured to discharge a liquid of cyan (C). The droplet discharge unit 33B is configured to discharge a liquid of magenta (M). The droplet discharge unit 33C is configured to discharge a liquid of yellow (Y). The droplet discharge unit 33D is configured to discharge a liquid of black (K). The droplet discharger 32 may also include a droplet discharge unit configured to discharge a liquid of a special color such as white, gold, or silver.

A discharge operation of each of the droplet discharge units 33 of the droplet discharger 32 is controlled by a drive signal corresponding to print information. When the sheet P supported on the conveyance drum 31 passes through a region facing the droplet discharger 32, the liquids of the respective colors are discharged from the corresponding droplet discharge units 33 toward the sheet P, and an image corresponding to the print information is printed on the sheet P.

The sheet P to which the liquids are applied by the droplet discharger 32 is transferred from the conveyance drum 31 to the delivery cylinder 35. The sheet P received by the delivery cylinder 35 is transferred to a conveyance mechanism 41 and transported to the drying unit (heating unit) 40. The drying unit 40 dries the liquids applied to the sheet P by the image forming unit 30. The drying of the liquids allows evaporation of the liquid components such as water in the liquids, and fixes colorants contained in the liquids on the sheet P. Further, curling of the sheet P is reduced.

The sheet reversing mechanism 60 reverses the sheet P, which has passed through the drying unit 40, in a switchback manner to perform double-sided printing. The reversed sheet P is fed back to a point located upstream of the transfer cylinder 34 through a conveyance path 61 of the image forming unit 30. The sheets P conveyed through the sheet reversing mechanism 60 are sequentially stacked on one another and held on the discharge tray 114.

Inclined Conveyance Mechanism

Figure 3A:
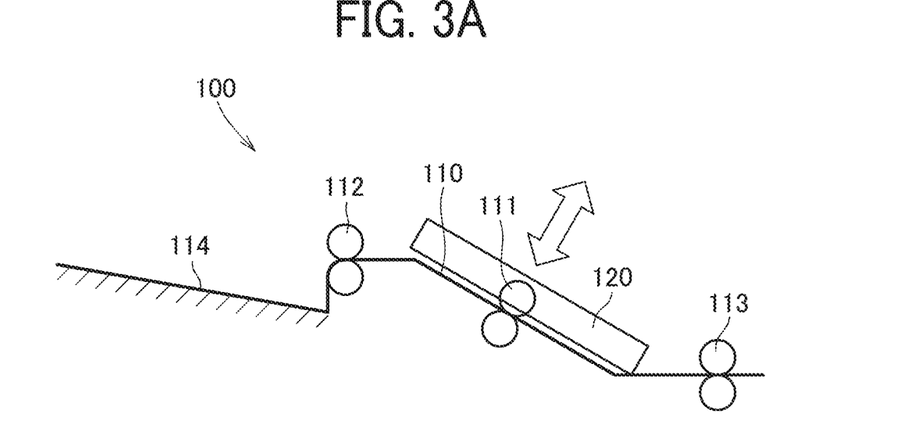
FIG. 3A is a side view of an inclined conveyance mechanism with an upper conveyance guide closed according to the embodiment of the present disclosure.
Figure 3B:
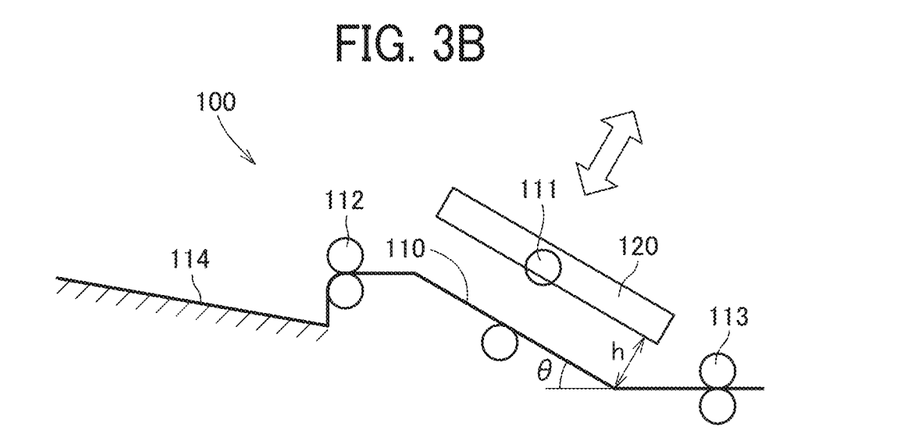
FIG. 3B is a side view of the inclined conveyance mechanism with the upper conveyance guide opened according to the embodiment of the present disclosure.

The inclined conveyance mechanism is coupled downstream of the last conveyance roller 62 of the sheet reversing mechanism 60, as illustrated in FIGS. 3A and 3B. The inclined conveyance mechanism forms an inclined conveyance path having an upward inclination θ.

The inclined conveyance mechanism includes a lower conveyance guide 110 and an upper conveyance guide 120. The lower conveyance guide 110 is located below the inclined conveyance path and guides a lower surface of the sheet P. The upper conveyance guide 120 is located above the inclined conveyance path and guides an upper surface of the sheet P. A drive-side conveyance roller 111 is disposed on a lower surface of the upper conveyance guide 120 to convey the sheet P.

An idler-side conveyance roller paired with the drive-side conveyance roller 111 is disposed on an upper surface of the lower conveyance guide 110. The inclined conveyance mechanism further includes a pair of inlet-side conveyance rollers 113 in a right portion (i.e., at an inlet) thereof, and a pair of discharge rollers 112 in a left portion (i.e., at an outlet) thereof.

Figure 3C:
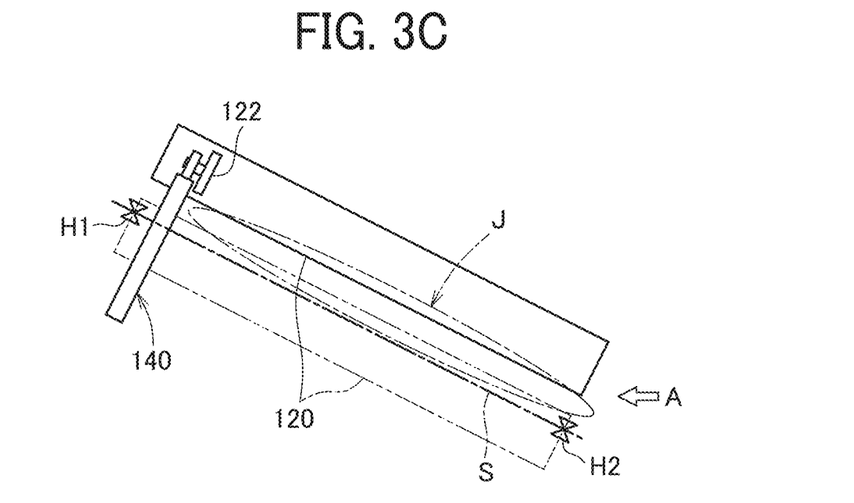
FIG. 3C is a view illustrating a paper-jam clearing area in the inclined conveyance mechanism illustrated in FIG. 3B.
Figure 4:
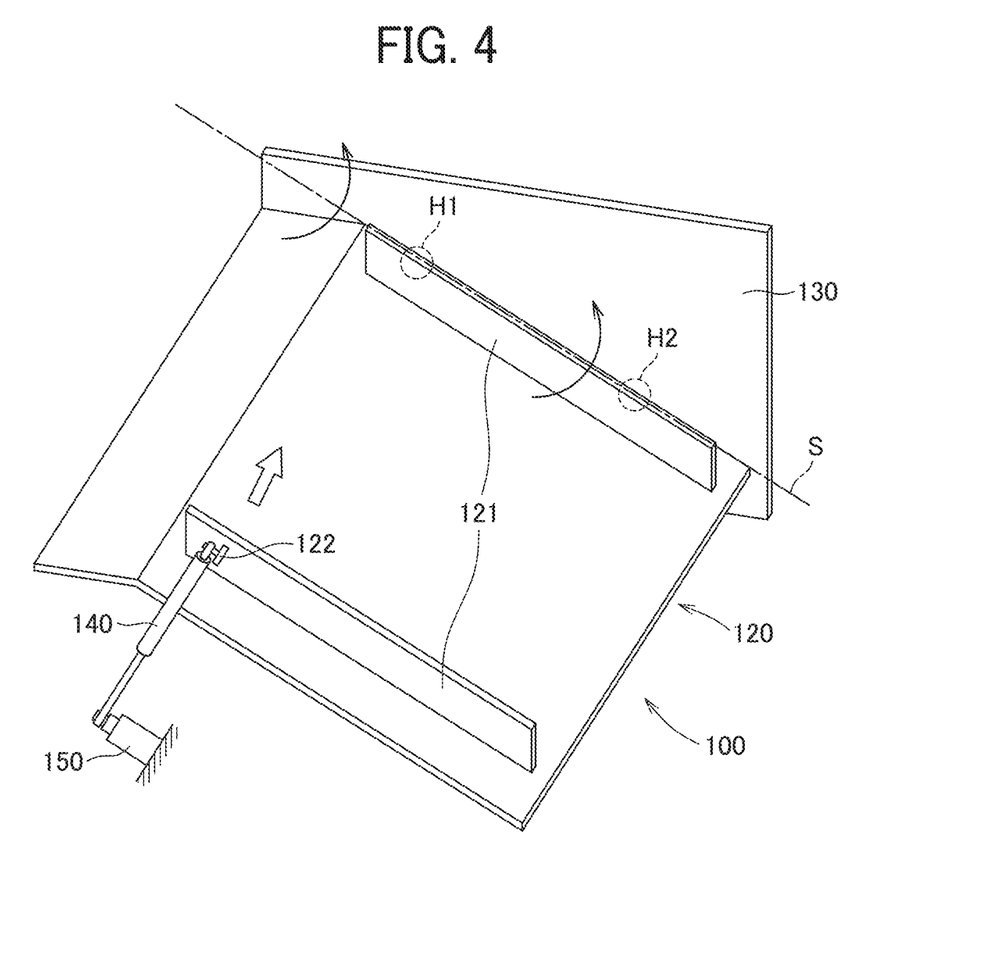
FIG. 4 is a perspective view of the upper conveyance guide to which a gas spring is attached according to the embodiment of the present disclosure.

As illustrated in FIGS. 3C and 4, the upper conveyance guide 120 is openable and closable about a rotation shaft S. The rotation shaft S is disposed on one side of the inclined conveyance path in the direction of the width of the inclined conveyance path so as to extend along the inclined conveyance path. As illustrated in FIG. 4, the rotation shaft S has a pair of upper and lower hinges H1 and H2 secured to a side plate 130 of the inclined conveyance mechanism. Referring to FIG. 3C, the upper conveyance guide 120 is rotated (opened) about the rotation shaft S from a position indicated by a phantom line to a position indicated by a solid line. As a result, the upper conveyance guide 120 can be opened at a height h in FIG. 3B to form a paper-jam clearing area J illustrated in FIG. 3C.

As illustrated in FIGS. 3C and 4, the upper conveyance guide 120 is configured such that a portion thereof away from the rotation shaft S is urged by a gas spring 140 in a direction in which the upper conveyance guide 120 is to be opened. In an example, the gas spring 140 is a second urging member. The gas spring 140 can reduce the force with which the upper conveyance guide 120 is lifted and opened for paper-jam clearing, and can hold the upper conveyance guide 120 in an opened state (free stop).

As illustrated in FIG. 4, the gas spring 140 may be attached to an upper end of the upper conveyance guide 120 in an inclined direction. In other words, the gas spring 140 may be attached to an end of the upper conveyance guide 120 on the side of the inclined conveyance path facing the side on which the rotation shaft S is disposed in the direction of the width of the inclined conveyance path. The attached gas spring 140 makes it possible to ensure that the paper-jam clearing area J illustrated in FIG. 3C is wide in the left-right direction. Further, the gas spring 140, which is disposed away from the rotation shaft S as much as possible, can reduce the lifting force of the upper conveyance guide 120. As a result, the diameter and cost of the gas spring 140 can be reduced, and the upper conveyance guide 120 can be prevented from being deformed due to lifting.

A proximal end of the main body of the gas spring 140 is pivotally mounted to an upper end bracket 122 of one of a pair of left and right reinforcing ribs 121 in FIG. 4. The pair of left and right reinforcing ribs 121 is disposed on an upper surface of the upper conveyance guide 120. A distal end of a rod of the gas spring 140 is pivotally mounted to a support 150. The support 150 is fixedly disposed in a lower portion of a side plate opposing the side plate 130.

Forces Acting on Upper Conveyance Guide

Figure 5A:
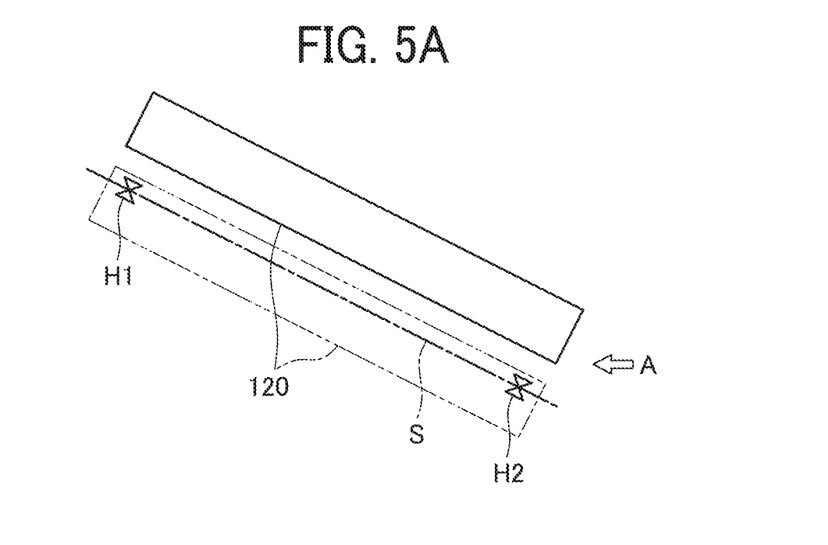
FIGS. 5A and 5B are a side view of the upper conveyance guide and a view of the upper conveyance guide as viewed in the direction of an arrow A in FIG. 5A, respectively, illustrating forces acting on the upper conveyance guide according to the embodiment of the present disclosure.
Figure 5B:
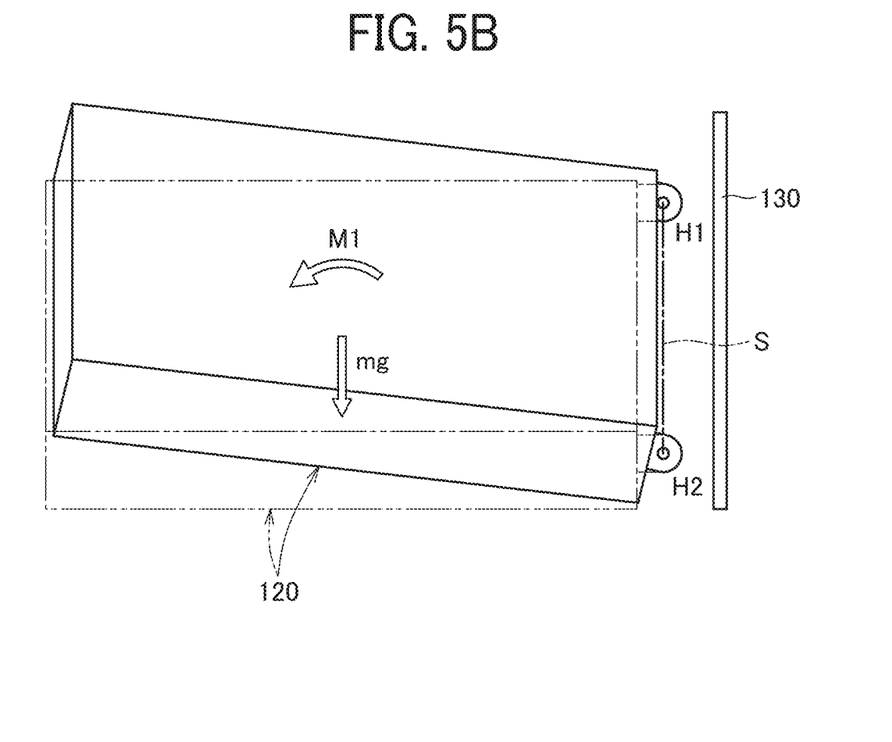

Forces acting on the upper conveyance guide 120 in an opened state will be described with reference to FIGS. 5A and 5B. In FIGS. 5A and 5B, a phantom line indicates the upper conveyance guide 120 in the closed position. When the upper conveyance guide 120 is in the closed position, the sheet P is conveyed along the inclined conveyance path.

Upon the occurrence of a paper jam, the upper conveyance guide 120 is lifted to a position indicated by a solid line in FIGS. 5A and 5B to clear the paper jam. Specifically, the upper conveyance guide 120 is rotated upward about the rotation shaft S.

At the rotation position indicated by the solid line in FIGS. 5A and 5B, as illustrated in FIG. 5B, the gravity mg and a moment M1 act on the rotation shaft S, where m is the mass of the upper conveyance guide 120 and g is gravitational acceleration. The moment M1 is a rotational moment about the rotation shaft S caused by a component force F1 (see FIG. 6A) of the gravity mg.

Figure 6A:
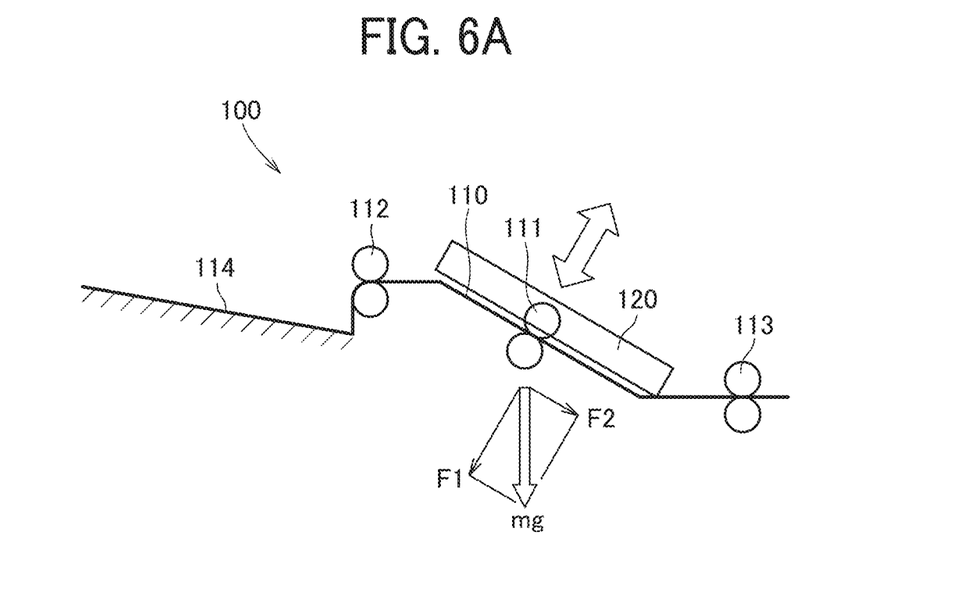
FIG. 6A is a side view of the upper conveyance guide, illustrating forces acting on the upper conveyance guide according to the embodiment of the present disclosure.

As illustrated in FIG. 6A, the gravity mg acting on the upper conveyance guide 120 can be divided into a force F1 perpendicular to the inclined conveyance path (a component force normal to the drive-side conveyance roller 111) and a force F2 parallel to the inclined conveyance path (a component force tangent to the drive-side conveyance roller 111). The force F2 acts in a direction in which a housing of the upper conveyance guide 120 is deformed downward along the inclined conveyance path.

Figure 6B:
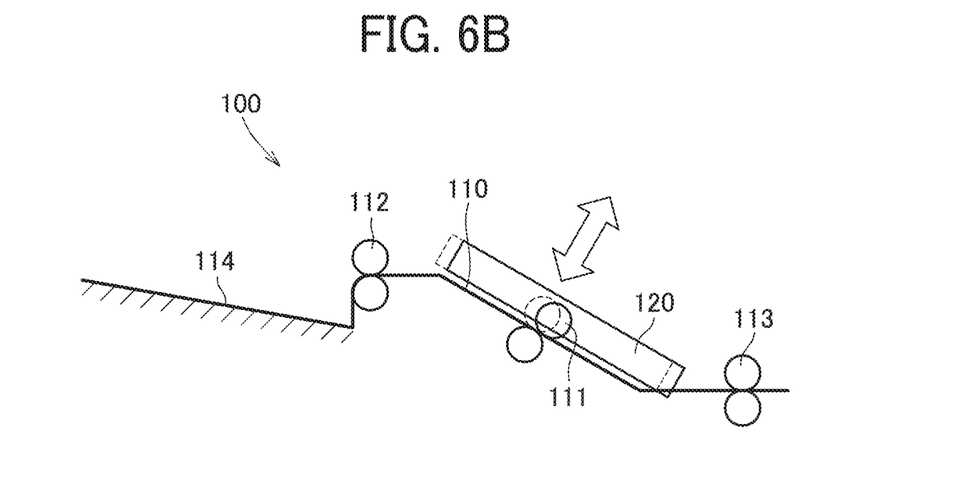
FIG. 6B is a side view of the upper conveyance guide whose position is shifted according to the embodiment of the present disclosure.

The housing of the upper conveyance guide 120 is not deformed by the force F2 if the housing has sufficient rigidity. As the rigidity of the housing increases, the mass of the housing increases, resulting in an increase in the gravity mg. Thus, the deformation of the housing of the upper conveyance guide 120 is actually inevitable to varying degrees. Such deformation of the upper conveyance guide 120 may cause a downward shift (or inclination) of the position of the drive-side conveyance roller 111 (a position on the side of the upper conveyance guide 120 farther from the rotation shaft S) in a manner indicated by a broken line and a solid line in FIG. 6B. As a result, a paper skew or jam may occur.

Figure 7A:
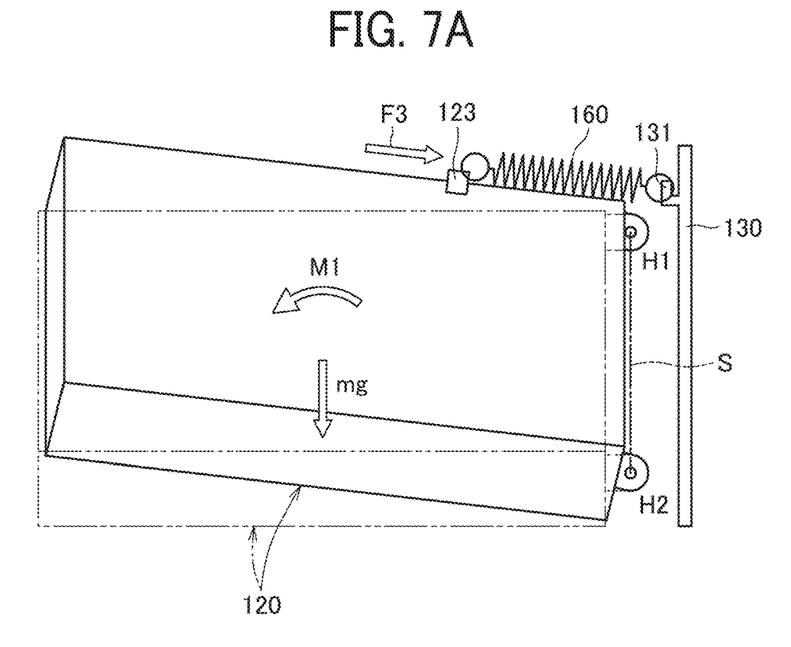
FIG. 7A is a view illustrating the action of a tension spring on the inclined conveyance mechanism in a first opened state according to the embodiment of the present disclosure.
Figure 7B:
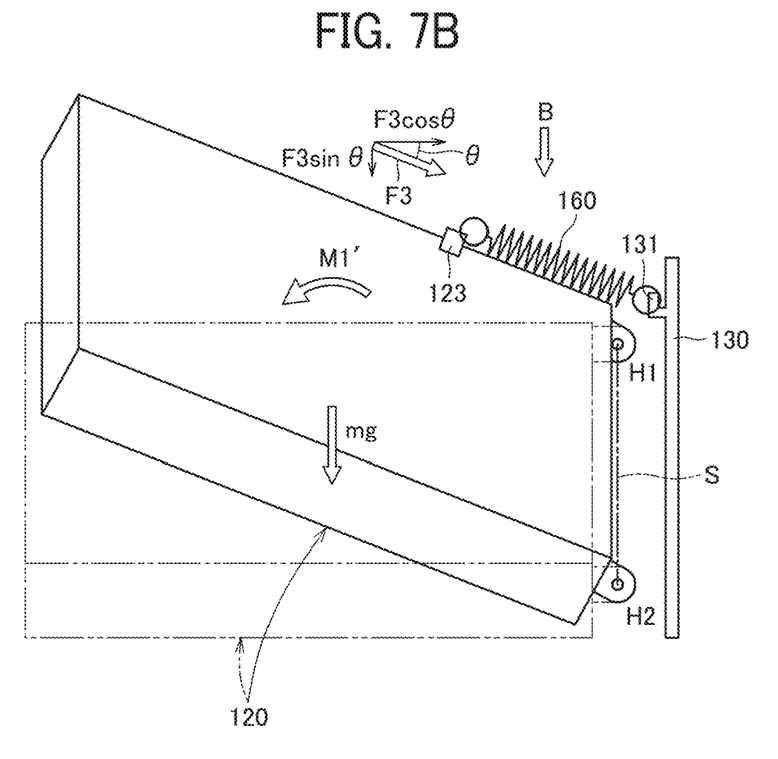
FIG. 7B is a view illustrating the action of the tension spring on the inclined conveyance mechanism in a second opened state according to the embodiment of the present disclosure.

Accordingly, this embodiment provides a tension spring 160, as illustrated in FIGS. 7A and 7B. In an example, the tension spring 160 is a first urging member. The tension spring 160 contracts with the opening of the upper conveyance guide 120 from a first opened state illustrated in FIG. 7A to a second opened state illustrated in FIG. 7B.

The tension spring 160 can prevent deformation of the housing of the upper conveyance guide 120 or inclination of the drive-side conveyance roller 111, which will be described below. The tension spring 160 is inexpensive. The inclined conveyance mechanism provided with the tension spring 160 can thus be implemented with low cost and low complexity.

The tension spring 160 is located between a bracket 131 disposed on an inner side surface of the side plate 130 and a bracket 123 disposed on the upper surface of the upper conveyance guide 120. In paper-jam clearing with the upper conveyance guide 120 opened widely in the state illustrated in FIG. 7B from the state illustrated in FIG. 7A, the tension spring 160 approaches the rotation shaft S in plan view (as viewed from an arrow B in FIG. 7B), and a component force F3 sin θ of a tensile force F3 of the tension spring 160 acts upward along the rotation shaft S, where θ represents the angle of inclination of the tension spring 160.

In FIG. 7B, the component force F3 sin θ is directed downward for convenience of illustration. Since the rotation shaft S is inclined away from the viewer of FIG. 7B, the component force F3 sin θ of the tensile force F3 acts upward along the rotation shaft S. The component force F3 sin θ acting upward is balanced with the component force F2 (FIG. 6A) of the gravity mg acting on the upper conveyance guide 120, thereby preventing deformation of the housing of the upper conveyance guide 120 or inclination of the drive-side conveyance roller 111.

Further, a rotational moment M1 or M1' about the rotation shaft S acts on the upper conveyance guide 120. The rotational moments M1 and M1' are generated by the gravity mg acting on the upper conveyance guide 120. As the center of gravity of the upper conveyance guide 120 horizontally approaches the rotation shaft S, the rotational moment decreases from the rotational moment M1 to the rotational moment M1'.

In terms of a reduction in the diameter and cost of the gas spring 140, it is not preferable that the rotational moment M1 or M1' is supported by the gas spring 140 alone. In this embodiment, a component force F3 cos θ acting on the upper conveyance guide 120 illustrated in FIG. 7B is used to generate a rotational moment M2 (FIG. 8) opposite in direction to the rotational moments M1 and M1'.

Figure 8:
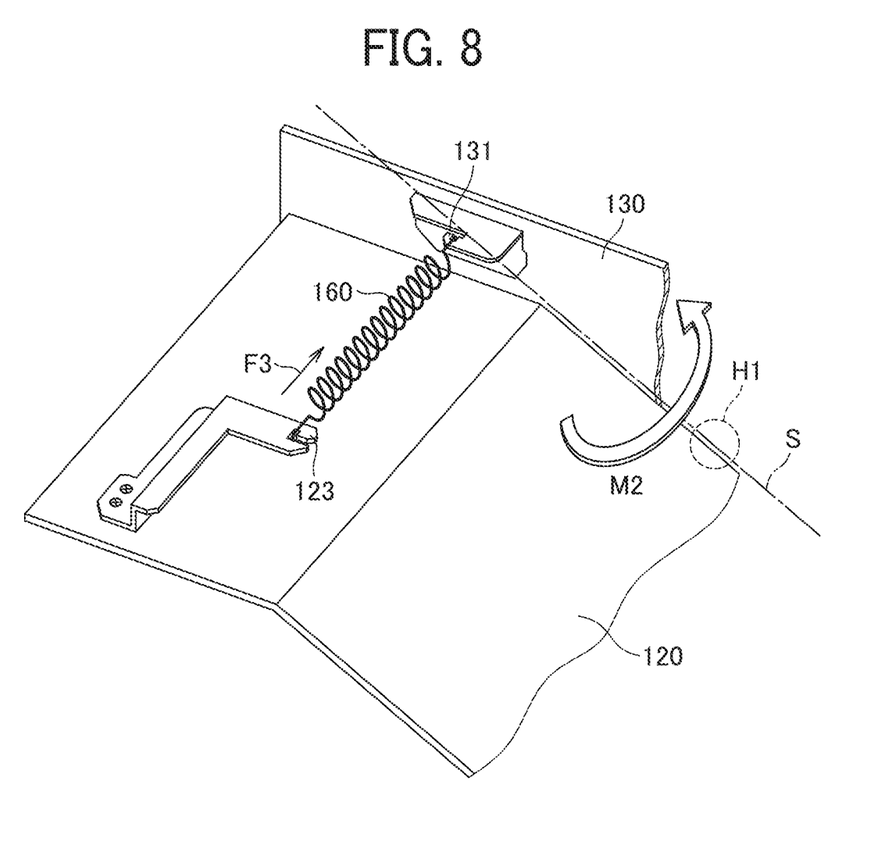
FIG. 8 is a perspective view of the upper conveyance guide, illustrating the action of the tension spring on the upper conveyance guide in a closed state.

The rotational moment M2 can reduce the load on the gas spring 140, resulting in a reduction in the diameter and cost of the gas spring 140. The reduction in the load on the gas spring 140 can prevent deformation of the upper conveyance guide 120.

While the present disclosure has been described in detail with reference to an embodiment, the present disclosure is not limited to the embodiment and may be modified in various ways without departing from the spirit and scope of the present disclosure. For example, while the embodiment described above relates to an inclined conveyance mechanism having an upward inclination, another embodiment of the present disclosure may provide an inclined conveyance mechanism having a downward inclination.

Still another embodiment of the present disclosure may provide a conveyance mechanism for conveying the sheets P in a vertical direction. In this embodiment, a one-side conveyance guide disposed on one side of a vertical conveyance path and typically disposed inside an opening/closing door is configured such that a portion thereof that is away from the rotation shaft S in the direction of the width of the vertical conveyance path and that is at an upper end of the one-side conveyance guide is urged toward the rotation shaft S by a tension spring serving as a first urging member.

The one-side conveyance guide is opened and closed in the horizontal direction about the rotation shaft S. Such a one-side conveyance guide is less likely to include the gas spring 140 for free stop. In an example, the one-side conveyance guide may include a second urging member, such as the gas spring 140, to open the one-side conveyance guide in a pop-up manner.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An inclined conveyance mechanism comprising:
   a lower conveyance guide disposed below an inclined conveyance path having an upward inclination or a downward inclination with which a sheet material is to be conveyed, the lower conveyance guide being configured to guide a lower surface of the sheet material;
   an upper conveyance guide located above the inclined conveyance path, the upper conveyance guide being configured to guide an upper surface of the sheet material, the upper conveyance guide being openable and closable about a rotation shaft, the rotation shaft being disposed on a side of the inclined conveyance path in a direction of a width of the inclined conveyance path so as to extend along the inclined conveyance path;

a first urging member configured to urge a portion of the upper conveyance guide away from the rotation shaft in the direction of the width of the inclined conveyance path, toward the rotation shaft, the portion of the upper conveyance guide away from the rotation shaft being at an upper end of the upper conveyance guide in an inclined direction; and a second urging member configured to urge the portion of the upper conveyance guide away from the rotation shaft in a direction in which the upper conveyance guide is to be opened.

2. The inclined conveyance mechanism according to claim 1, wherein the first urging member comprises a tension spring.

3. The inclined conveyance mechanism according to claim 1, wherein the second urging member is attached to an end of the upper conveyance guide on a side of the inclined conveyance path facing the side on which the rotation shaft is disposed in the direction of the width of the inclined conveyance path, the end of the upper conveyance guide being at the upper end of the upper conveyance guide in the inclined direction.

4. The inclined conveyance mechanism according to claim 1, wherein the second urging member comprises a gas spring.

5. An image forming apparatus comprising:
the inclined conveyance mechanism according to claim 1; and
an image forming device configured to form an image on the sheet material to be conveyed by the inclined conveyance mechanism.

6. A conveyance mechanism comprising:
a first-side conveyance guide located on a first side of a conveyance path along which a sheet material is to be conveyed in a vertical direction, the first-side conveyance guide being configured to guide a first surface of the sheet material, the first-side conveyance guide being openable and closable about a rotation shaft, the rotation shaft being disposed on a side of the conveyance path in a direction of a width of the conveyance path so as to extend along the conveyance path;

a second-side conveyance guide located on a second side of the conveyance path facing the first side, the second-side conveyance guide being configured to guide a second surface of the sheet material opposing the first surface;

a first urging member configured to urge a portion of the first-side conveyance guide away from the rotation shaft in the direction of the width of the conveyance path, toward the rotation shaft, the portion of the first-side conveyance guide away from the rotation shaft being at an upper end of the first-side conveyance guide; and a second urging member configured to urge the portion of the first-side conveyance guide away from the rotation shaft in a direction in which the first-side conveyance guide is to be opened.

7. The conveyance mechanism according to claim 6, wherein the first urging member comprises a tension spring.

8. The conveyance mechanism according to claim 6, wherein the second urging member is attached to an end of the first-side conveyance guide on a side of the conveyance path facing the side on which the rotation shaft is disposed in the direction of the width of the conveyance path, the end of the first-side conveyance guide being at the upper end of the first-side conveyance guide.

9. The conveyance mechanism according to claim 6, wherein the second urging member comprises a gas spring.

10. An image forming apparatus comprising:
the conveyance mechanism according to claim 6; and
an image forming device configured to form an image on the sheet material to be conveyed by the conveyance mechanism.

* * * * *